United States Patent
Guha et al.

(10) Patent No.: US 10,932,238 B2
(45) Date of Patent: Feb. 23, 2021

(54) IDENTIFYING A TYPE OF CELLULAR CONNECTION AND A TYPE OF SERVICE AREA FROM CELLULAR BROADCAST DATA

(71) Applicant: Verizon Patent and Licensing Inc., Arlington, VA (US)

(72) Inventors: Ratul Kumar Guha, Warwick, PA (US); Jignesh S. Panchal, Hillsborough, NJ (US); Lily Zhu, Parsippany, NJ (US); Xin Wang, Morris Plains, NJ (US); Hui Zhao, Marlboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 57 days.

(21) Appl. No.: 16/225,827

(22) Filed: Dec. 19, 2018

(65) Prior Publication Data

US 2019/0335446 A1    Oct. 31, 2019

Related U.S. Application Data

(63) Continuation-in-part of application No. 16/173,713, filed on Oct. 29, 2018, now Pat. No. 10,548,029, and
(Continued)

(51) Int. Cl.
*H04W 72/04* (2009.01)
*G06F 9/30* (2018.01)
(Continued)

(52) U.S. Cl.
CPC .... *H04W 72/0413* (2013.01); *G06F 9/30003* (2013.01); *H04W 28/0215* (2013.01); *H04W 74/002* (2013.01)

(58) Field of Classification Search
None
See application file for complete search history.

(56) References Cited

U.S. PATENT DOCUMENTS 8,538,421 B2    9/2013    Brisebois et al.
9,456,337 B2    9/2016    Amerga et al.
(Continued)

OTHER PUBLICATIONS

"5G indicator for EN-DC", GPP TSG-RAN WG2 #100, R2-1713443, Ericsson, 21 pages, Dec. 2017.
(Continued)

*Primary Examiner* — Andre Tacdiran

(57) ABSTRACT

A user device parses system information block data, received from a first cell, to identify an upper layer indicator element, and determines, based on the upper layer indicator element, that the user device is in an EN-DC area. The user device causes, based on determining that the user device is in the EN-DC area, first display of a first indicator on a display of the user device, and sends a request to the first cell for a data connection. The user device receives, from the first cell, a message that indicates a second cell will initiate the data connection via a 5G NR millimeter wave connection. The user device causes, based on the message, display of a second indicator on the display of the user device for a threshold amount of time, and then causes second display of the first indicator on the display of the user device.

20 Claims, 11 Drawing Sheets

Related U.S. Application Data a continuation-in-part of application No. 15/963,714, filed on Apr. 26, 2018, now Pat. No. 10,609,627.

(51) Int. Cl.
*H04W 28/02* (2009.01)
*H04W 74/00* (2009.01)

(56) References Cited

U.S. PATENT DOCUMENTS

| | | | | |
|---|---|---|---|---|
| 2008/0248815 | A1* | 10/2008 | Busch | G06Q 20/3224 455/456.5 |
| 2011/0001484 | A1* | 1/2011 | Stits | H01M 10/425 324/426 |
| 2015/0201394 | A1* | 7/2015 | Qu | H04W 4/021 455/456.1 |
| 2018/0302945 | A1* | 10/2018 | Kwon | H04W 76/38 |
| 2018/0368016 | A1* | 12/2018 | Lee | H04W 64/00 |
| 2019/0053136 | A1 | 2/2019 | Lee et al. | |
| 2019/0069205 | A1 | 2/2019 | Lee et al. | |
| 2019/0069226 | A1 | 2/2019 | Lee et al. | |
| 2019/0069229 | A1* | 2/2019 | Lee | H04W 88/06 |
| 2019/0069325 | A1 | 2/2019 | Yerramalli et al. | |
| 2019/0215885 | A1 | 7/2019 | Wu | |
| 2019/0223091 | A1 | 7/2019 | Huang-Fu et al. | |
| 2019/0268833 | A1 | 8/2019 | Kwok | |
| 2019/0379469 | A1* | 12/2019 | Lu | H04W 76/27 |
| 2020/0100181 | A1* | 3/2020 | Jia | H04W 52/0235 |
| 2020/0187140 | A1* | 6/2020 | Berglund | H04W 88/06 |
| 2020/0205224 | A1* | 6/2020 | Lee | H04W 28/065 |

OTHER PUBLICATIONS

"Clarification of the UpperlayerIndication in SIB2 (RILNo COO8)", 3GPP TSG-RAN WG2 NR Ad hoc 0118, R2-1801529, CATT, 6 pages, Jan. 2018.

Ericsson, "Introducing 5G indication in LTE RRC SIB", 3GPP TSG-RAN WG2 #99bis, 20 pages, Oct. 2017.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.8.1 (Jan. 2018), 644 pages, Jan. 2018.

* cited by examiner

US 10,932,238 B2

IDENTIFYING A TYPE OF CELLULAR CONNECTION AND A TYPE OF SERVICE AREA FROM CELLULAR BROADCAST DATA

RELATED APPLICATION(S)

This application is a continuation-in-part (CIP) of U.S. patent application Ser. No. 15/963,714, filed on Apr. 26, 2018, the content of which is incorporated by reference herein in its entirety; this application is also a continuation-in-part (CIP) of U.S. patent application Ser. No. 16/173,713, filed on Oct. 29, 2018, the content of which is also incorporated by reference herein in its entirety.

BACKGROUND

Telecommunications components included in user equipment, such as mobile phones, personal computers, tablet computers, wearable computing devices, and/or the like, can be capable of communicating wirelessly using a radio transmitter and a radio receiver. Different types of radios exist for different forms of wireless communication, including long term evolution (LTE) radios for LTE communications, 5G radios for 5G communications, such as 5G new radio (NR) millimeter wave communications, 3G radios for 3G communications, code division multiple access (CDMA) radios for CDMA communications, and/or the like.

DETAILED DESCRIPTION OF PREFERRED EMBODIMENTS

Figure 1A:
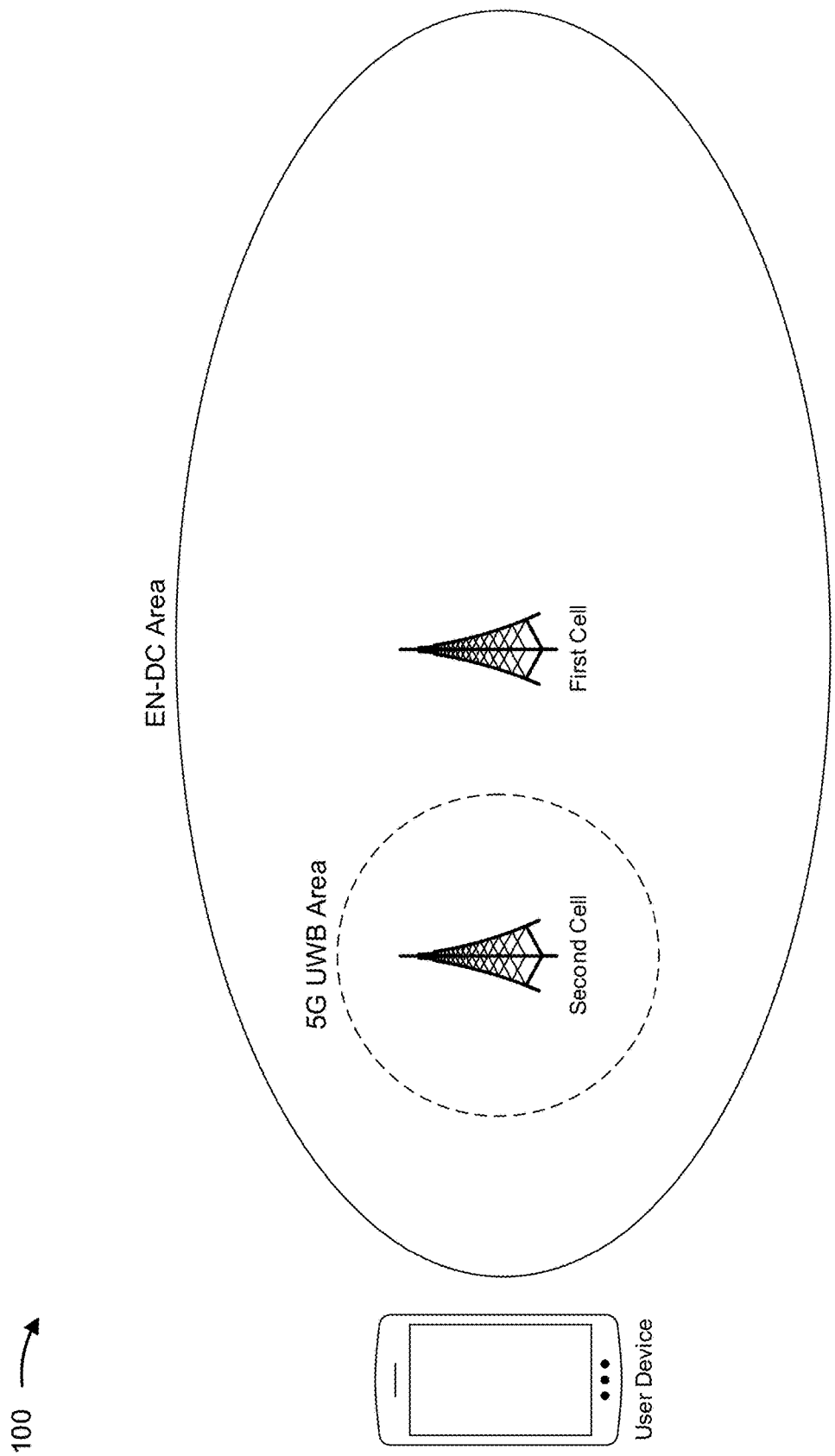
FIGS. 1A-1H are diagrams of example implementations described herein.

The following detailed description of example implementations refers to the accompanying drawings. The same reference numbers in different drawings can identify the same or similar elements.

Often, electronic devices, such as user devices (e.g., user equipment, such as a smart phone, tablet computer, laptop computer, and/or the like) include components for wirelessly communicating with other electronic devices over a variety of radio telecommunications networks operating using a variety of frequencies and protocols. In a situation where a user device communicates with a cellular base station (e.g., to access a telecommunications network), the user device can determine the type of base station to which the user device is connected (e.g., CDMA, third generation (3G), fourth generation (4G) or LTE, fifth generation (5G) or New Radio (NR), and/or the like) based on the modem or radio used by the user device to connect to the base station. However, communication technology can differ in a situation where the same modem or radio is used; for example, a cellular modem or radio can be used in multiple different types of communication technology, including 4G LTE communications, 5G NR communications, 5G NR sub-6 GHz communications, 5G NR millimeter wave communications, and/or the like. Further, in some cases, a user device can enter an area where more than one type of communication technology is available, such as an Evolved-Universal Terrestrial Radio Access-New Radio Dual Connectivity (EN-DC) area (e.g., an area that can provide an LTE cellular connection within the entire area and a 5G NR millimeter wave cellular connection in one or more parts of the area), but there is currently no way for the user device to determine that more than one type of communication technology is available.

Some implementations, described herein, provide a user device that is capable of using system information (e.g., included in a system information block (SIB)) broadcast by a cell (e.g., a cellular base station) to distinguish between different types of communication technology (e.g., types of cellular connections) used by the cell and/or to distinguish between different types of service areas of the cell. In this way, the user device can determine if more than one type of communication technology is available and display one or more indicators that indicate whether more than one type of communication technology is available.

For example, in some implementations, the user device can receive system information (e.g., master information block (MIB) data, first system information block (SIB1) data, second system information block (SIB2) data, third system information block (SIB3) data, and/or the like) from a first cell. In some implementations, the system information can include cell metadata (e.g., information capable of being used by the user device for a variety of purposes) that includes one or more cellular parameters, such as an upper layer indicator element (e.g., an upperLayerIndication parameter in the SIB2 data). In some implementations, the user device can identify the upper layer indicator element and, based on the upper layer indicator element, determine that the user device is in an EN-DC area and cause display of a first indicator (e.g., that indicates that an LTE cellular connection and/or a 5G NR millimeter wave cellular connection are available). In some implementations, the user device can send a request to the first cell for a data connection and receive from the first cell a message that indicates a second cell will initiate the data connection via a 5G NR millimeter wave cellular connection. In some implementations, the user device can cause display of a second indicator (e.g., that indicates that the user device can communicate with the second cell via the 5G NR millimeter wave cellular connection) on the display of the user device for a threshold amount of time and cause display of the first indicator again after the threshold amount of time has passed.

In this way, a user device can determine if more than one type of communication technology is available and display one or more indicators that indicate whether more than one type of communication technology is available, which can facilitate a variety of actions being taken by the user device. For example, the user device can perform a variety of actions without requiring additional information to be provided by the cell, including connecting to the cell based on a type of cellular connection of the cell, a type of service area of the cell, and/or the like (e.g., prioritizing one cell over another), displaying a type of cellular connection of the cell indicator and/or a type of service area of the cell indicator (e.g., providing a user of the user device with cell information), and/or the like. Moreover, this can provide an improved user experience for a user of the user device because the user can know what type of cellular connection, what type of service area, and/or the like is available for the user device, which can facilitate how the user uses the user device and/or what applications the user causes to run on the user device. Several different stages of the process for determining the type of the cellular connection of the cell, the type of service area of the cell, and/or the like are automated, which can improve speed and efficiency of the determining process and conserve computing resources (e.g., processor resources, memory resources, power resources, and/or the like) of, for example, the user device. Furthermore, implementations described herein use a rigorous, computerized process to perform tasks that were not previously performed. Finally, automating the process for determining the type of the cellular connection of the cell, the type of service area of the cell, and/or the like from cellular broadcast data conserves computing resources (e.g., processor resources, memory resources, power resources, and/or the like) that would otherwise be wasted by using multiple different types of communications data and/or devices with different software, protocols, and configurations.

FIGS. 1A-1D are diagrams of an example implementation 100 described herein. Example implementation 100 can include a plurality of cells, such as a first cell and a second cell shown in FIG. 1A, and a user device. In some implementations, the plurality of cells can each provide a type of cellular connection, also referred to as a radio access type (RAT). For example, the first cell can provide a long-term evolution (LTE) cellular connection (e.g., an LTE radio access connection) and/or the second cell can provide a fifth generation (5G) new radio (NR) millimeter wave cellular connection (e.g., a 5G NR millimeter wave radio access connection, also referred to as a 5G ultra-wideband (UWB) radio access connection). In some implementations, each cell can be associated with a separate base station. In some implementations, one or more of the cells can share a base station (e.g., a single base station can be associated with multiple cells). In some implementations, a cell of the plurality of cells can communicate with another cell, of the plurality of cells. For example, the first cell can send, to the second cell, information indicating that the first cell provides an LTE cellular connection and/or the second cell can send, to the first cell, information indicating that the second cell provides a 5G NR millimeter wave cellular connection. In some implementations, the first cell and the second cell can communicate via a signaling transport link, such as an X2 signaling transport link.

Each cell of the plurality of cells can have a service area, such as a particular geographic area (e.g., a radius around the cell), an area associated with a geofence, an area in which the cell can provide a cellular connection to communicate with a user device, and/or the like. In some implementations, the first cell can determine, based on receiving information from the second cell (such as the information indicating that the second cell provides a 5G NR millimeter wave cellular connection), that the service area of the first cell overlaps with the service area of the second cell. In some implementations, based on determining that the service area of the first cell overlaps the service area of the second cell, the first cell can determine that the service area of the first cell is a dual connectivity area, such as an Evolved-Universal Terrestrial Radio Access-New Radio Dual Connectivity (EN-DC) area (e.g., an area that can provide an LTE cellular connection within the entire area and a 5G NR millimeter wave cellular connection in one or more parts of the area). For example, as shown in FIG. 1A, the first cell can have a service area that is an EN-DC area that overlaps with a service area of the second cell that is a 5G NR millimeter wave area.

Figure 1B:
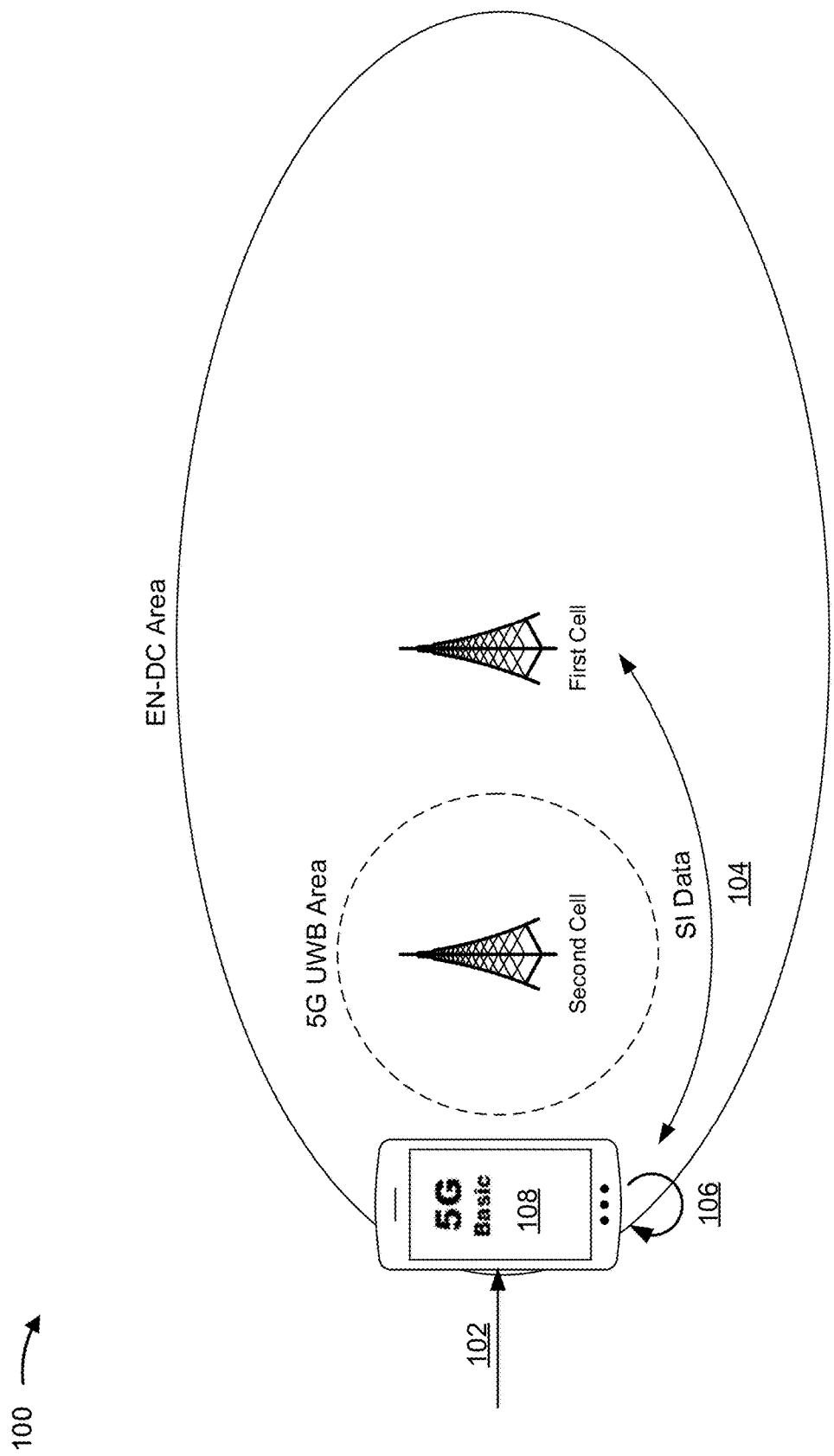

As shown in FIG. 1B and by reference number 102, the user device can enter the service area of the first cell (e.g., shown as the EN-DC Area). As shown by reference number 104, the user device and the first cell can communicate to establish a cellular connection. In some implementations, the first cell can transmit system information data to the user device and the user device can receive the system information data from the first cell. The system information data can include, for example, master information block (MIB) data, first system information block (SIB1) data, second system information block (SIB2) data, third system information block (SIB3) data, and/or the like, which is periodically broadcast by the first cell in a manner designed to enable user devices to connect to the first cell. In some implementations, the system information data can include cell metadata that includes one or more cellular parameters, such as an upper layer indicator element (e.g., an upperLayerIndication parameter in the SIB2 data), a public land mobile network (PLMN) information list element (e.g., a PLMN-InfoList parameter in the SIB2 data), and/or the like. In some implementations, the upper layer indicator element can indicate a type of cellular connection of the first cell, a type of service area of the first cell, and/or the like.

As shown by reference number 106, the user device can obtain the cell metadata from the system information data and identify the one or more cellular parameters. In some implementations, the user device can parse the cell metadata to identify the one or more cellular parameters. For example, the user device can parse the cell metadata to identify the upper layer indicator element. In some implementations, the user device can determine, based on the one or more cellular parameters, the type of the cellular connection of the first cell, the type of service area of the first cell, and/or the like. For example, based on the upper layer indicator element, the user device can determine that the first cell provides an LTE cellular connection, that the service area of the first cell is an EN-DC area, and/or the like.

In this way, the user device can determine a type of cellular connection of a cell, a type of service area of the cell, and/or the like based on cell metadata included in system information data broadcast by the cell. Determining the type of the cellular connection of the cell, the type of service area of the cell, and/or the like can enable the user device to take a variety of actions. For example, the user device can determine whether to connect to the cell based on the type of the cellular connection of the cell, the type of service area of the cell, and/or the like. As another example, the user device can configure a communication component of the user device (e.g., an antenna, a modem, a receiver, a transmitter, a transceiver, a transmit chain, a receive chain, a networking element, and/or the like) to facilitate communication with the first cell, the second cell, and/or the like based on the type of the cellular connection of the cell, the type of service area of the cell, and/or the like.

As shown by reference number 108, the user device can cause, based on determining the type of the cellular connection of the first cell, the type of service area of the first cell, and/or the like, display (e.g., on a display of the user device) of a first indicator. In some implementations, the first indicator can provide a visual indication to a user of the user device of the type of the cellular connection of the first cell, the type of service area of the first cell, and/or the like. In some implementations, the first indicator can indicate that the user device is in communication with the type of the cellular connection of the first cell, that the user device is in the type of service area of the first cell, and/or the like. For example, the user device can cause display of an indicator, such as an "LTE" indicator, to indicate that the user device is in communication with the LTE cellular connection provided by the first cell. In another example, the user device can cause display of an indicator, such as a "5G Basic" indicator, shown in FIG. 1B, to indicate that the user device is in the EN-DC area of the first cell.

In some implementations, the first indicator can also provide an indication of the type of the cellular connection of the first cell, the type of service area of the first cell, and/or the like to one or more applications operating on the user device, enabling the application(s) to take one or more actions based on the type of the cellular connection of the first cell, the type of service area of the first cell, and/or the like. For example, an application operating on the user device can use information identifying the type of the cellular connection of the first cell, the type of service area of the first cell, and/or the like, to determine whether the user device should connect to the first cell (e.g., a particular type of the cellular connection of the first cell, a particular type of service area of the first cell, and/or the like, might be preferred, or disfavored, by a particular user device and/or application).

In this way, the user device can use system information data broadcast by a cell to determine a type of cellular connection of the cell, a type of service area of the cell, and/or the like. Based on the type of cellular connection of the cell, the type of service area of the cell, and/or the like, the user device can take a variety of actions designed to improve the user experience and/or the functionality of the user device.

Figure 1C:
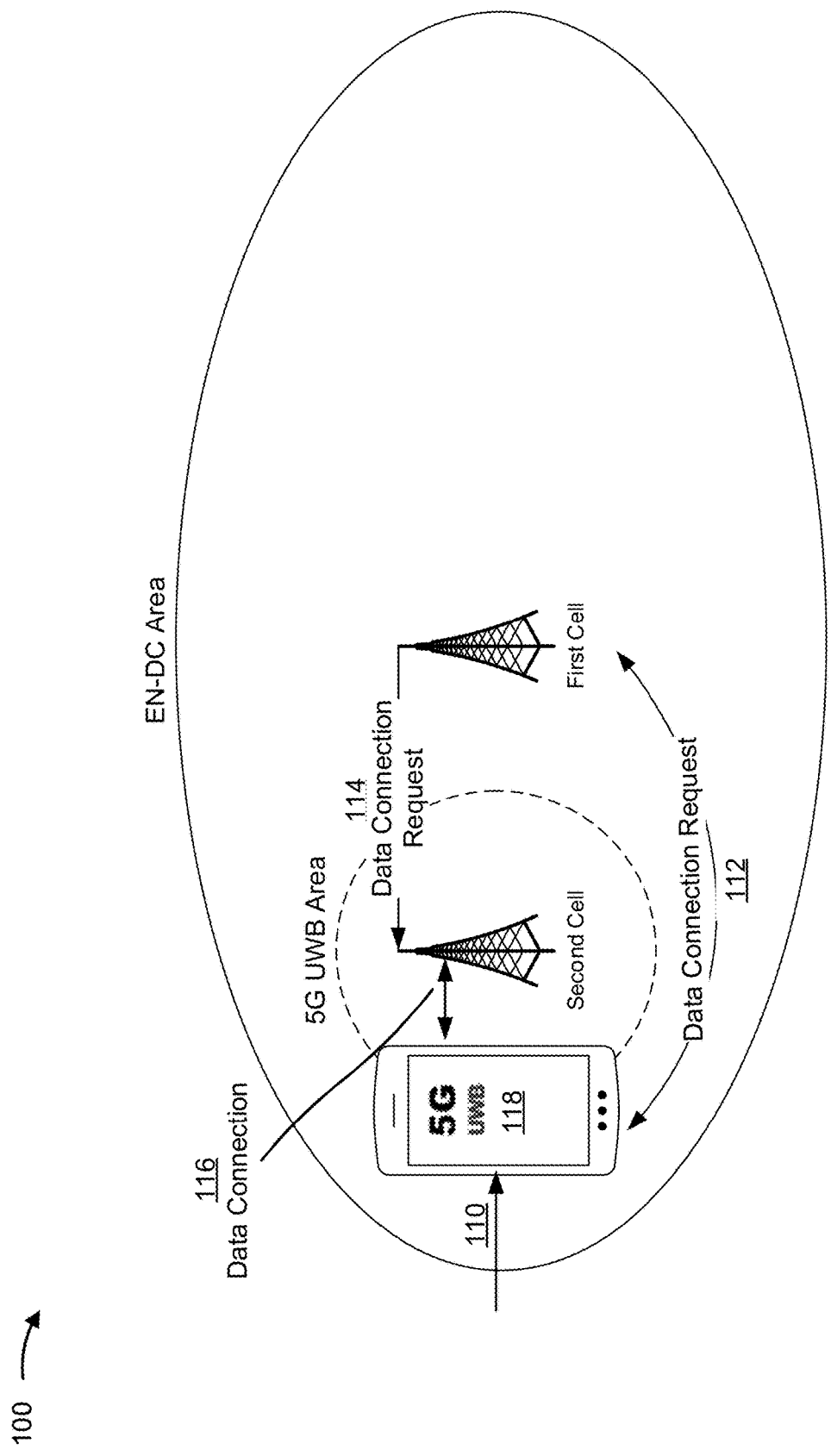

As shown in FIG. 1C and by reference number 110, the user device can enter the service area of the second cell (shown as the 5G UWB Area). As shown by reference number 112, the user device (e.g., via the one or more applications operating on the user device) can communicate with the first cell to establish a data connection. In some implementations, the user device can send a request to establish the data connection to the first cell. In some implementations, the request can indicate that the data connection should be established via a 5G NR millimeter wave cellular connection. In some implementations, the first cell can receive and process the request to determine that a 5G NR millimeter wave cellular connection should be established between the user device and the second cell. In some implementations, the first cell can send a message to the user device that indicates that the second cell will initiate the data connection via a 5G NR millimeter wave cellular connection.

As shown by reference number 114, the first cell, based on determining that the 5G NR millimeter wave cellular connection should be established between the user device and the second cell, can send the request to establish the data connection to the second cell. In some implementations, the first cell can send information to the second cell that indicates that the second cell should establish the data connection with the user device via the 5G NR millimeter wave cellular connection. As shown by reference number 116, the second cell can establish the data connection between the second cell and the user device. In some implementations, the second cell can establish the data connection between the second cell and the user device via the 5G NR millimeter wave cellular connection. In some implementations, the user device and the second cell can communicate data via the data connection. In some implementations, the user device and the second cell can communicate via the data connection for a period of time.

As shown by reference number 118, the user device can receive, from the first cell, the message that indicates that the second cell will initiate the data connection via a 5G NR millimeter wave cellular connection and cause, based on the message, display (e.g., on the display of the user device) of a second indicator. In some implementations, the user device can cause display of the second indicator for a threshold amount of time and/or while the user device is in the service area of the first cell and/or the second cell, while the user device communicates with the second cell via the data connection, while the user device periodically receives system information data from the first cell, and/or the like. In some implementations, the second indicator can provide a visual indication to a user of the user device of the type of the cellular connection of the second cell, the type of service area of the first cell and/or the second cell, and/or the like. In some implementations, the second indicator can indicate that the user device is in communication with the type of the cellular connection of the second cell, that the user device is in the type of service area of the first cell and/or the second cell, and/or the like. For example, the user device can cause display of a "5G UWB" indicator to indicate that the user device is in communication with the 5G NR millimeter wave cellular connection provided by the second cell. Additionally, or alternatively, the user device can cause display of the "5G UWB" indicator to indicate that the user device is in the EN-DC area of the first cell and/or the 5G NR millimeter wave cellular connection area of the second cell. In some implementations, the second indicator can also provide an indication of the type of the cellular connection of the second cell, the type of service area of the first cell and/or the second cell, and/or the like to one or more applications operating on the user device, enabling the application(s) to take action based on the type of the cellular connection of the second cell, the type of service area of the first cell and/or the second cell, and/or the like in a similar manner as described herein in reference to FIG. 1B and reference number 108.

Figure 1D:
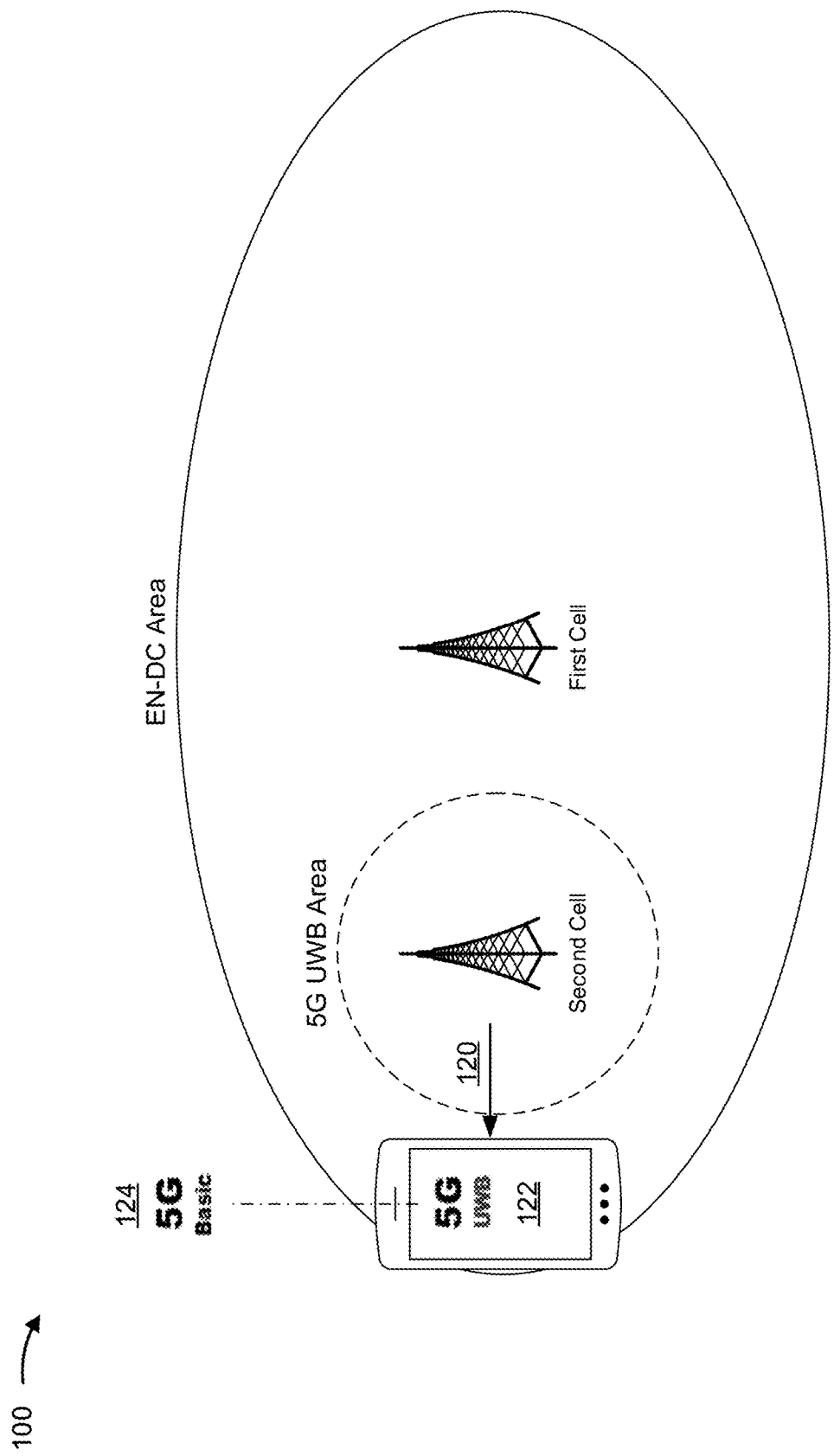

As shown in FIG. 1D and by reference number 120, the user device can leave the service area of the second cell (shown as the 5G UWB Area). As shown by reference number 122, the user device can continue to cause display of the second indicator for a threshold amount of time, even after the user device leaves the service area of the second cell.

In some implementations, the user device can determine the location of the user device (e.g., by using a global positioning system (GPS) of the user device) and/or the location of the second cell (e.g., by receiving information indicating the location of the second cell from the first cell and/or the second cell) to determine the threshold amount of time. For example, the user device can determine that the threshold amount of time should be unlimited while the user device is within a proximity distance or area of the second cell, such as the service area of the second cell. As another example, the user device can determine that the threshold amount of time should be high (e.g., greater than 3 minutes, 20 minutes, an hour, and/or the like) when the user device is within the proximity area of the second cell and that the threshold amount of time should be low (e.g., less than 3 minutes, 20 minutes, an hour, and/or the like) when the user device is outside the proximity area of the second cell. In some implementations, the user device can determine the threshold amount of time based on the period of time that the user device communicates with the second cell via the data connection. For example, the user device can determine that the threshold amount of time should be high (e.g., greater than 20 seconds, 1 minute, 4 minutes, 45 minutes, 90 minutes and/or the like) if the period of time is high (e.g., greater than 20 seconds, 1 minute, 4 minutes, 45 minutes, 90 minutes and/or the like) and the threshold amount of time should be low (e.g., less than 20 seconds, 1 minute, 4 minutes, 45 minutes, 90 minutes and/or the like) if the period of time is low. In some implementations, the user device can determine that the user device has stopped communicating with the second cell to determine the threshold amount of time. For example, the user device can determine the threshold amount of time should begin when the user device has stopped communicating with the second cell.

As shown by reference number 124, the user device can cause, after causing display of the second indicator for the threshold amount of time, display of the first indicator on the display of the user device after display of the second indicator has stopped. For example, the user device can cause, after causing display of the "5G UWB" indicator for the threshold amount of time, display of the "5G Basic" indicator.

Figure 1E:
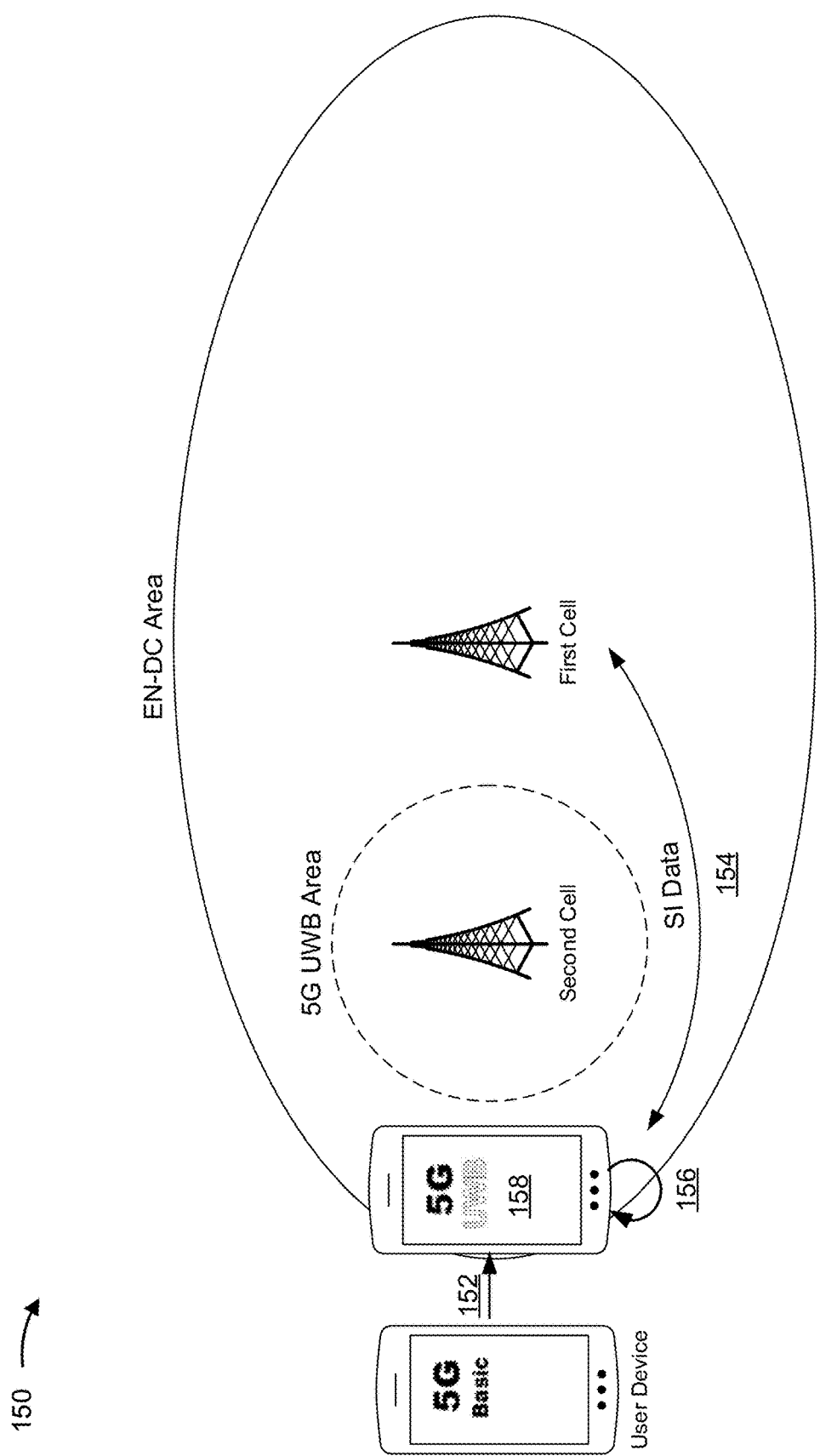
Figure 1F:
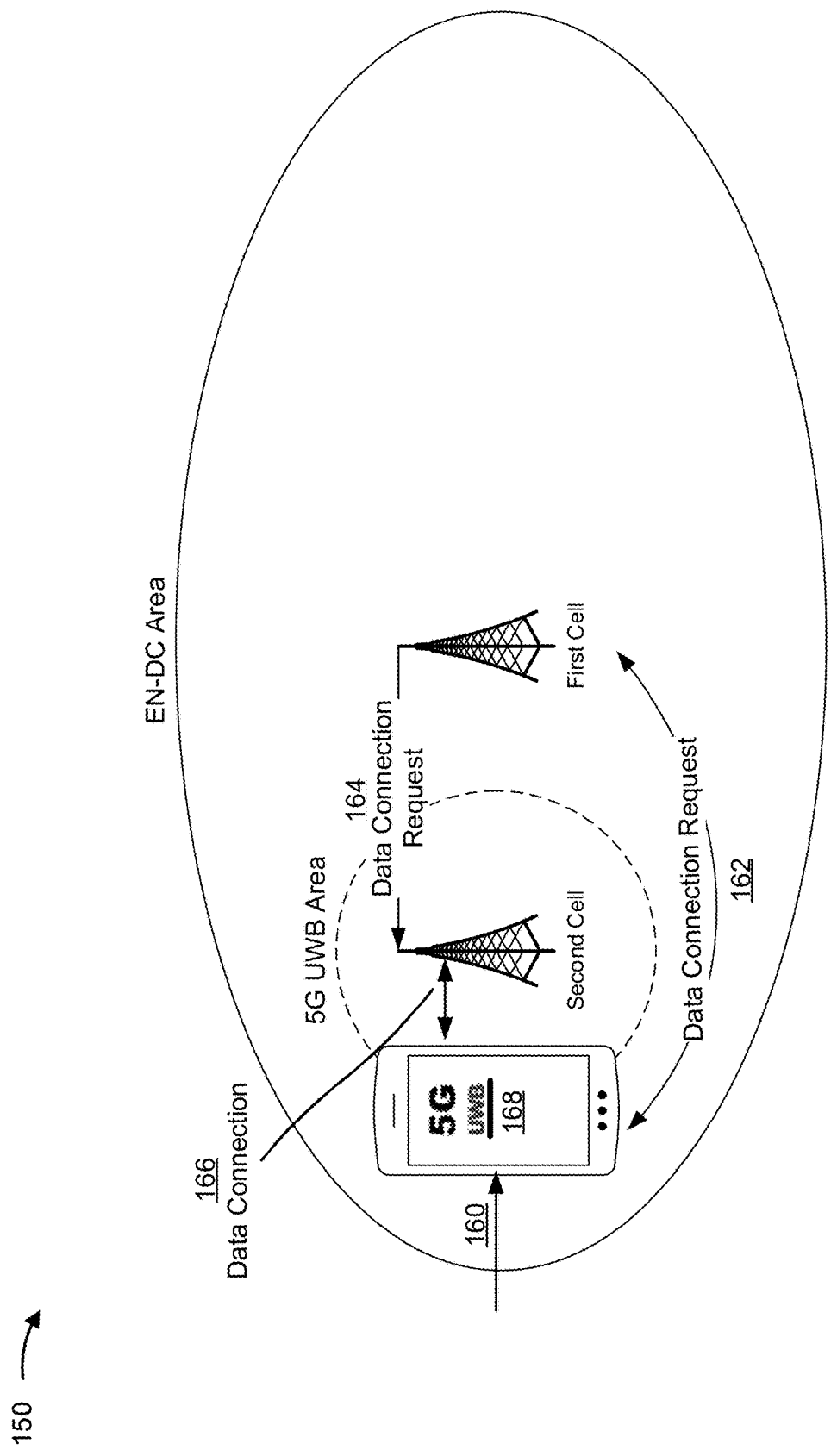
Figure 1G:
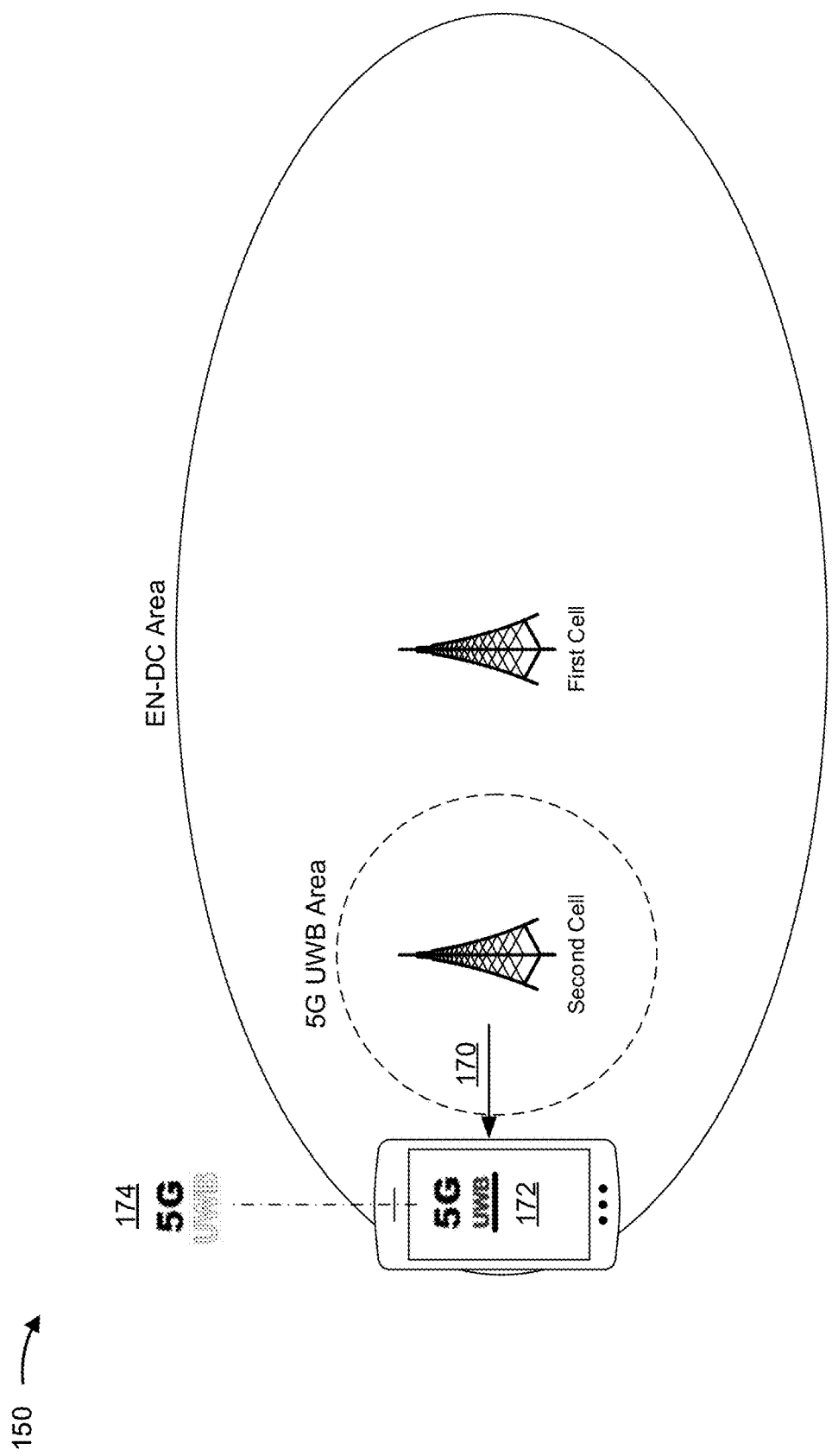

FIGS. 1E-1G are diagrams of another example implementation 150 described herein. As shown in FIG. 1E, example implementation 150 can include a user device, a first cell with a service area (shown as the EN-DC Area), and a second cell with a service area (shown as the 5G UWB Area) that are the same or similar to the user device, the first cell, and the second cell described above, e.g., with reference to example implementation 100 of FIGS. 1A-1D.

As shown in FIG. 1E, the user device can cause a display of a default indicator whenever the user device is outside the first service area of the first cell. In some implementations, the default indicator can provide a visual indication to a user of the user device of a default connection capability of the user device. For example, as shown in FIG. 1E, the user device can cause display of an indicator, such as a "5G Basic" indicator, to indicate that the user device can connect to an LTE cellular connection and/or a 5G NR millimeter wave cellular connection.

As shown by reference number 152, the user device can enter the service area of the first cell (e.g., shown as the EN-DC Area) in a similar manner as described herein in relation to FIG. 1B and reference number 102. As shown by reference number 154, the user device can communicate with the first cell to establish a cellular connection with the first cell in a similar manner as described herein in relation to FIG. 1B and reference number 104. For example, the first cell can transmit, to the user device, system information data that includes cell metadata that includes one or more cellular parameters, such as an upper layer indicator element. In some implementations, the upper layer indicator element can indicate a type of cellular connection of the first cell, a type of service area of the first cell, and/or the like. As shown by reference number 156, the user device can process the system information data, the metadata, and/or the one or more cellular parameters to identify the upper layer indicator element and determine the type of the cellular connection of the first cell, the type of service area of the first cell, and/or the like in a similar manner as described herein in relation to FIG. 1B and reference number 106. For example, based on the upper layer indicator element, the user device can determine that the first cell provides an LTE cellular connection, that the service area of the first cell is an EN-DC area, and/or the like. In this way, the user device can determine a type of cellular connection of a cell, a type of service area of the cell, and/or the like based on cell metadata included in system information data broadcast by the cell, which can enable the user device to take the same or similar actions as described above, e.g., with reference FIG. 1B.

As shown by reference number 158, the user device can cause, based on determining the type of the cellular connection of the first cell, the type of service area of the first cell, and/or the like, display (e.g., on a display of the user device) of a first indicator in a similar manner as described herein in relation to FIG. 1B and reference number 108. In some implementations, the first indicator can provide a visual indication to a user of the user device of the type of the cellular connection of the first cell, the type of service area of the first cell, and/or the like. In some implementations, the first indicator can indicate that the user device is in communication with the type of the cellular connection of the first cell, that the user device is in the type of service area of the first cell, and/or the like. For example, the user device can cause display of an indicator, such as an "5G UWB" indicator, where the "UWB" is grayed out, to indicate that the user device is in communication with the LTE cellular connection provided by the first cell and/or that the user device is in the EN-DC area of the first cell. In some implementations, the first indicator can also provide an indication of the type of the cellular connection of the first cell, the type of service area of the first cell, and/or the like to one or more applications operating on the user device in a similar manner as described herein in relation to FIG. 1B and reference number 108. In this way, the user device can use system information data broadcast by a cell to determine a type of cellular connection of the cell, a type of service area of the cell, and/or the like, to take a variety of actions designed to improve the user experience and/or the functionality of the user device.

As shown in FIG. 1F and by reference number 160, the user device can enter the service area of the second cell (shown as the 5G UWB Area) in a similar manner as described herein in relation to FIG. 1C and reference number 110. As shown by reference number 162, the user device (e.g., via the one or more applications operating on the user device) can communicate with the first cell to establish a data connection in a similar manner as described herein in relation to FIG. 1B and reference number 112. For example, the first cell can determine that the data connection should be established via a 5G NR millimeter wave cellular connection between the user device and the second cell. In some implementations, the first cell can send a message to the user device that indicates that the second cell will initiate the data connection via a 5G NR millimeter wave cellular connection. As shown by reference number 164, the user device can send information to the second cell that indicates that the second cell should establish the data connection with the user device via the 5G NR millimeter wave cellular connection in a similar manner as described herein in relation to FIG. 1C and reference number 114. As shown by reference number 166 the second cell can establish the data connection between the second cell and the user device via the 5G NR millimeter wave cellular connection in a similar manner as described herein in relation to FIG. 1C and reference number 116.

As shown by reference number 168, the user device can receive the message that indicates that the second cell will initiate the data connection via a 5G NR millimeter wave cellular connection from the first cell and cause, based on the message, display (e.g., on the display of the user device) of a second indicator in a similar manner as described herein in relation to FIG. 1C and reference number 118. In some implementations, the user device can cause display of the second indicator for a threshold amount of time and/or while the user device is in the service area of the first cell and/or the second cell, while the user device communicates with the second cell via the data connection, while the user device periodically receives system information data from the first cell, and/or the like. In some implementations, the second indicator can provide a visual indication to a user of the user device of the type of the cellular connection of the second cell, the type of service area of the first cell and/or the second cell, and/or the like. In some implementations, the second indicator can indicate that the user device is in communication with the type of the cellular connection of the second cell, that the user device is in communication with the type of service area of the first cell and/or the second cell, and/or the like. For example, the user device can cause display of a "5G UWB" indicator, where the "UWB" is in bold and/or underlined, to indicate that the user device is in communication with the 5G NR millimeter wave cellular connection provided by the second cell. Additionally, or alternatively, the user device can cause display of the "5G UWB" indicator, where the "UWB" is in bold and/or underlined, to indicate that the user device is in the EN-DC area of the first cell and/or the 5G NR millimeter wave cellular connection area of the second cell. In some implementations, the second indicator can also provide an indication of the type of the cellular connection of the second cell, the type of service area of the first cell and/or the second cell, and/or the like to one or more applications operating on the user device in a similar manner as described herein in relation to FIG. 1C and reference number 118.

As shown in FIG. 1G and by reference number 170, the user device can leave the service area of the second cell (shown as the 5G UWB Area) in a similar manner as described herein in relation to FIG. 1D and reference number 120. As shown by reference number 172, the user device can determine a threshold amount of time and cause display of the second indicator for the threshold amount of time, even after the user device leaves the service area of the second cell, in a similar manner as described herein in relation to FIG. 1D and reference number 122. As shown by reference number 174, the user device can cause, after causing display of the second indicator for the threshold amount of time, display of the first indicator on the display of the user device in a similar manner as described herein in relation to FIG. 1D and reference number 124. For example, the user device can cause, after causing display of the "5G UWB" indicator, where the "UWB" is in bold and/or underline, for the threshold amount of time, display of the "5G UWB" indicator, where the "UWB" is grayed out.

Other implementations are possible with regard to example implementations 100 and 150. For example, in some implementations of example implementations 100 and 150, the user device, while causing display of the second indicator during the threshold amount of time, can communicate with the first cell to establish an additional data connection. In some implementations, the user device can send a request to establish the additional data connection to the first cell. In some implementations, the request can indicate that the additional data connection should be established via a 5G NR millimeter wave cellular connection. In some implementations, the first cell can receive and process the request to determine that an LTE cellular connection should be established between the user device and the first cell and/or that a 5G NR millimeter wave cellular connection cannot be established between the user device and the second cell because the user device is outside the service area of the second cell. In some implementations, the first cell can send a message to the user device that indicates that a 5G NR millimeter wave cellular connection is not available and/or that the first cell will initiate the additional data connection via an LTE cellular connection. In some implementations, the user device, based on the message, can cause display of the second indicator to stop.

As another example, in some implementations of example implementations 100 and 150, the user device can leave the service area of the first cell (shown in FIGS. 1A-1G as the EN-DC Area). In some implementations, the user device can leave the service area of the first cell and enter the service area of a third cell that does not support EN-DC. In some implementations, the user device and the third cell can communicate to establish a cellular connection in a similar manner as described herein in relation to FIG. 1B and reference number 104. For example, the third cell can transmit additional system information data, which can include cell metadata that includes an additional upper layer indicator element, to the user device and the user device can receive the additional system information data from the third cell. In some implementations, the additional upper layer indicator element can indicate a type of cellular connection of the third cell, a type of service area of the third cell, and/or the like. In some implementations, the user device can parse the cell metadata to identify the additional upper layer indicator element and parse the additional upper layer indicator element to determine that the third cell provides an LTE cellular connection, that the service area of the third cell is an LTE area (not an EN-DC area), and/or the like.

In some implementations, the user device can cause, based on determining the type of the cellular connection of the third cell (e.g., that the third cell provides an LTE cellular connection), the type of service area of the third cell (e.g. that the service area of the third cell is an LTE area, not a EN-DC area), and/or the like, display of a third indicator in a similar manner as described herein in relation to FIG. 1B and reference number 108. In some implementations, the third indicator can indicate that the user device is in communication with the type of the cellular connection of the third cell, that the user device is in the type of service area of the third cell, and/or the like. For example, the user device can cause display of an "LTE" indicator to indicate that the user device is in the LTE area of the third cell and/or that the user device is not in an EN-DC area.

Figure 1H:

FIG. 1H is a diagram of an example implementation 180 described herein. As shown in FIG. 1H, example implementation 180 depicts different types of indicators that the user device can cause to be displayed (e.g., on the display of the user device). As shown by reference number 182, a "5G Basic" indicator can indicate that the user device is in the EN-DC area of the first cell, the user device can connect to an LTE cellular connection and/or a 5G NR millimeter wave cellular connection, and/or the like as described herein in relation to FIGS. 1A-1G. As shown by reference number 184, a "5G UWB" indicator, where the "UWB" is grayed out, can indicate that the user device is in communication with the LTE cellular connection provided by the first cell, the user device is in the EN-DC area of the first cell, and/or the like as described herein in relation to FIGS. 1A-1G. As shown by reference number 186, a "5G UWB" indicator, where the "UWB" is in bold and/or underlined, can indicate that the user device is in communication with the 5G NR millimeter wave cellular connection provided by the second cell, the user device is in the EN-DC area of the first cell and/or the 5G NR millimeter wave cellular connection area of the second cell, and/or the like as described herein in relation to FIGS. 1A-1G.

As indicated above, FIGS. 1A-1H are provided merely as examples. Other examples can differ from what is described with regard to FIGS. 1A-1H.

Figure 2:
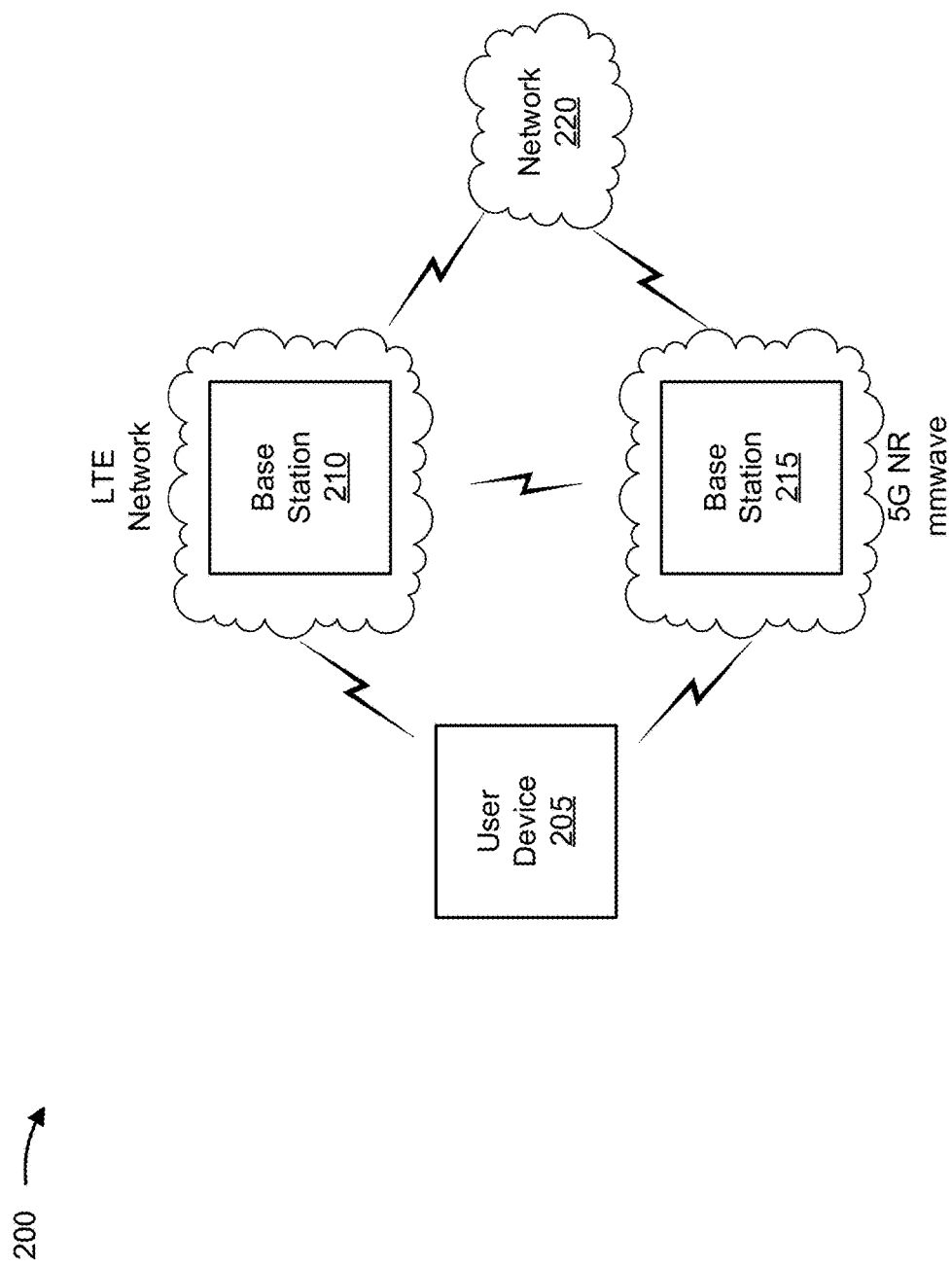
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a user device 205, a base station 210, a base station 215, a network 220, and/or the like. Devices of environment 200 can interconnect via wired connections, wireless connections, or a combination of wired and wireless connections.

User device 205 can include one or more devices capable of communicating with base station 210, base station 215, and/or a network (e.g., network 220). For example, user device 205 can include a wireless communication device, a radiotelephone, a personal communications system (PCS) terminal (e.g., that can combine a cellular radiotelephone with data processing and data communications capabilities), a smart phone, a wearable computing device, a laptop computer, a tablet computer, a personal gaming system, and/or a similar device. In some implementations, user device 205 can communicate with base station 210 and/or base station 215 to establish a cellular connection. In some implementations, user device 205 can receive system information data from base station 210, identify an upper layer indicator element in the system information data, and determine a type of the cellular connection of the first cell and/or a type of service area of the first cell in order to cause display of a first indicator. In some implementations, the user device 205 can communicate with a second cell via a data connection, cause display of a second indicator for a threshold amount of time, and then cause display of the first indicator again.

Base station 210 (e.g., also referred to as a cell, or cell site) can include one or more devices capable of transferring traffic, such as audio, video, text, and/or other traffic, destined for and/or received from user device 205. In some implementations, base station 210 can include an eNB associated with a long-term evolution (LTE) network that receives traffic from and/or sends traffic to network 220. Base station 210 can send traffic to and/or receive traffic from user device 205 via an air interface. In some implementations, base station 210 can include a small cell base station, such as a base station of a microcell, a picocell, and/or a femtocell. In some implementations, base station 210 can communicate with base station 215 via a signaling transport link, transmit system information data to user device 205, and facilitate base station 215 establishing a data connection with user device 205. In some implementations, base station 210 can provide an LTE cellular connection (e.g., an LTE radio access connection). In some implementations, base station 210 can have an LTE service area or an Evolved-Universal Terrestrial Radio Access-New Radio Dual Connectivity (EN-DC) service area.

Base station 215 (e.g., also referred to as a cell, or cell site) can include one or more devices capable of transferring traffic, such as audio, video, text, and/or other traffic, destined for and/or received from user device 205. In some implementations, base station 215 can include a gNB associated with a fifth generation (5G) new radio (NR) millimeter wave network that receives traffic from and/or sends traffic to network 220. Base station 215 can send traffic to and/or receive traffic from user device 205 via an air interface. In some implementations, base station 215 can include a small cell base station, such as a base station of a microcell, a picocell, and/or a femtocell. In some implementations, base station 215 can communicate with base station 210 via a signaling transport link and establish a data connection with user device 205. In some implementations, base station 215 can provide a 5G NR millimeter wave cellular connection (e.g., a 5G NR millimeter wave radio access connection, also referred to as a 5G ultra-wideband (UWB) radio access connection). In some implementations, base station 215 can have a 5G UWB service area.

Network 220 can include one or more wired and/or wireless networks. For example, network 220 can include a cellular network (e.g., an LTE network, a 5G NR millimeter wave network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
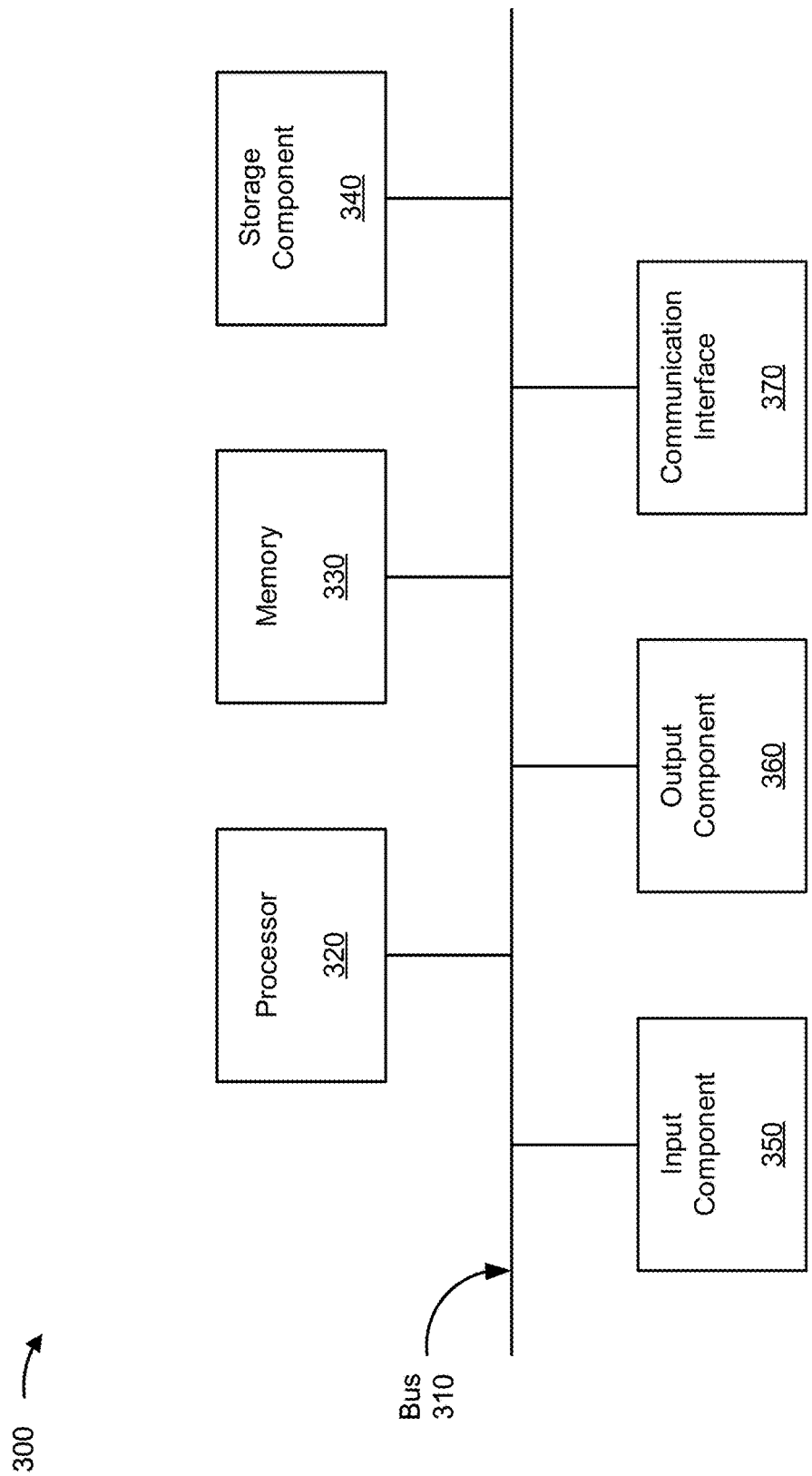
FIG. 3 is a diagram of example components of one or more devices of FIG. 2.

FIG. 3 is a diagram of example components of a device 300. Device 300 can correspond to user device 205, base station 210, and/or base station 215. In some implementations, user device 205, base station 210, and/or base station 215 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
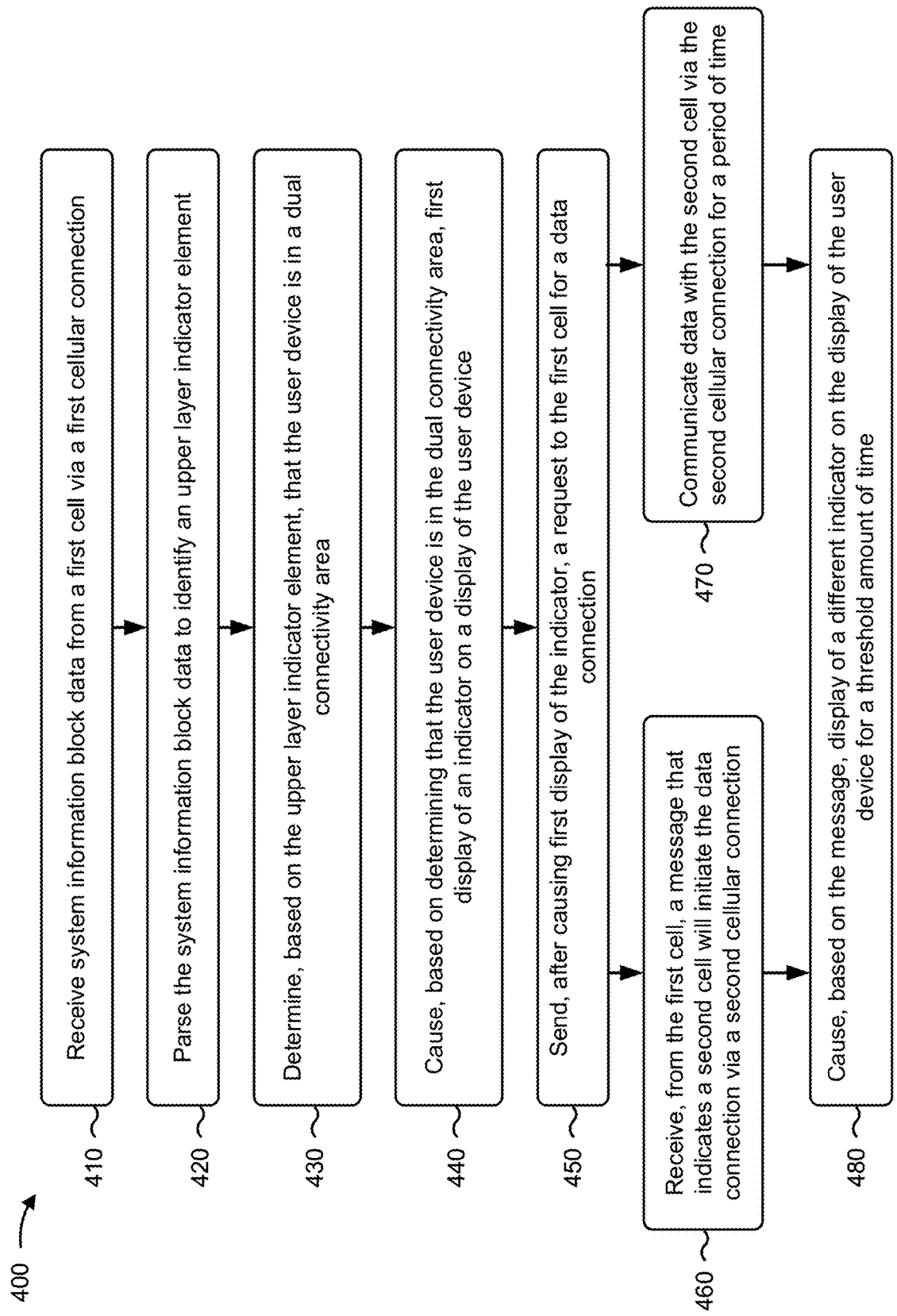
FIG. 4 is a flow chart of an example process for a system and method for identifying a type of cellular connection and a type of service area from cellular broadcast data.

FIG. 4 is a flow chart of an example process 400 for identifying a type of cellular connection and a type of service area from cellular broadcast data. In some implementations, one or more process blocks of FIG. 4 can be performed by a user device (e.g., user device 205). In some implementations, one or more process blocks of FIG. 4 can be performed by another device or a group of devices separate from or including the user device, such as base station 210 or base station 215.

As shown in FIG. 4, process 400 can include receiving system information block data from a first cell via a first cellular connection (block 410). For example, the user device (e.g., using processor 320, memory 330, storage component 340, input component 350, communication interface 370, and/or the like) can receive system information block data from a first cell via a first cellular connection, as described above.

As further shown in FIG. 4, process 400 can include parsing the system information block data to identify an upper layer indicator element (block 420). For example, the user device (e.g., using processor 320, memory 330, storage component 340, and/or the like) can parse the system information block data to identify an upper layer indicator element, as described above.

As further shown in FIG. 4, process 400 can include determining, based on the upper layer indicator element, that the user device is in a dual connectivity area (block 430). For example, the user device (e.g., using processor 320, memory 330, storage component 340, and/or the like) can determine, based on the upper layer indicator element, that the user device is in a dual connectivity area, as described above.

As further shown in FIG. 4, process 400 can include causing, based on determining that the user device is in the dual connectivity area, first display of an indicator on a display of the user device (block 440). For example, the user device (e.g., using processor 320, memory 330, storage component 340, output component 360, communication interface 370, and/or the like) can cause, based on determining that the user device is in the dual connectivity area, first display of an indicator on a display of the user device, as described above.

As further shown in FIG. 4, process 400 can include sending, after causing first display of the indicator, a request to the first cell for a data connection (block 450). For example, the user device (e.g., using processor 320, memory 330, storage component 340, output component 360, communication interface 370, and/or the like) can send, after causing first display of the indicator, a request to the first cell for a data connection, as described above.

As further shown in FIG. 4, process 400 can include receiving, from the first cell, a message that indicates a second cell will initiate the data connection via a second cellular connection (block 460). For example, the user device (e.g., using processor 320, memory 330, storage component 340, input component 350, communication interface 370, and/or the like) can receive, from the first cell, a message that indicates a second cell will initiate the data connection via a second cellular connection, as described above.

As further shown in FIG. 4, process 400 can include communicating data with the second cell via the second cellular connection for a period of time (block 470). For example, the user device (e.g., using processor 320, memory 330, storage component 340, communication interface 370, and/or the like) can communicate data with the second cell via the second cellular connection for a period of time, as described above.

As further shown in FIG. 4, process 400 can include causing, based on the message, display of a different indicator on the display of the user device for a threshold amount of time (block 480). For example, the user device (e.g., using processor 320, memory 330, storage component 340, output component 360, communication interface 370, and/or the like) can cause, based on the message, display of a different indicator on the display of the user device for a threshold amount of time, as described above.

Process 400 can include additional implementations, such as any single implementation or any combination of implementations described below and/or in connection with one or more other processes described elsewhere herein.

In some implementations, the indicator can indicate that the user device is in the dual connectivity area, and the different indicator can indicate that the user device is in the dual connectivity area and can communicate via the second cellular connection.

In some implementations, when causing display of the different indicator on the display of the user device for the threshold amount of time, the user device can determine a location of the user device, can determine a location of the second cell, and can determine, based on the location of the user device and the location of the second cell, the threshold amount of time.

In some implementations, the user device can determine, based on the period of time, the threshold amount of time. In some implementations, when determining that the user device is in a dual connectivity area, the user device can configure a communication component of the user device to facilitate communication with the first cell.

In some implementations, the user device can cause, after causing display of the different indicator for the threshold amount of time, second display of the indicator on the display of the user device, can send an additional request to the first cell for an additional data connection, and can receive, from the first cell, an additional message that indicates the first cell will initiate the additional data connection via the first cellular connection.

In some implementations, the user device can receive additional system information block data from a third cell that does not support dual connectivity, can parse the additional system information block data to identify an additional upper layer indicator element, can determine, based on the additional upper layer indicator element, that the user device is not in a dual connectivity area, and can cause, based on determining that the user device is not in a dual connectivity area, display of an additional indicator on the display of the user device, where the additional indicator indicates that the user device is not in a dual connectivity area.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device comprising:
one or more memories; and
one or more processors, communicatively coupled to the one or more memories, to:
receive system information block data from a first cell via a first cellular connection;
parse the system information block data to identify an upper layer indicator element;
determine, based on the upper layer indicator element, that the user device is in a dual connectivity area;
cause, based on determining that the user device is in the dual connectivity area, first display of an indicator on a display of the user device;
send, by the user device after causing first display of the indicator, a request to the first cell for a data connection;
receive, at the user device from the first cell, a message that indicates a second cell will initiate the data connection via a second cellular connection; and
cause, based on the message, display of a different indicator on the display of the user device for a threshold amount of time, wherein the threshold amount of time is finite and based at least in part on a geographic area associated with the second cell.

2. The user device of claim 1, wherein the indicator indicates that the user device is in the dual connectivity area, and
wherein the different indicator indicates that the user device is in the dual connectivity area and can communicate via the second cellular connection.

3. The user device of claim 1, wherein the one or more processors, when causing display of the different indicator on the display of the user device for the threshold amount of time, are to:
determine a location of the user device; and
determine, based on the location of the user device and the geographic area associated with the second cell, the threshold amount of time.

4. The user device of claim 1, wherein the one or more processors are further to:
communicate data with the second cell via the second cellular connection for a period of time; and
determine, based on the period of time, the threshold amount of time.

5. The user device of claim 1, wherein the one or more processors, when determining that the user device is in a dual connectivity area, are to:
configure a communication component of the user device to facilitate communication with the first cell.

6. The user device of claim 1, wherein the one or more processors are further to:
cause, after causing display of the different indicator for the threshold amount of time, second display of the indicator on the display of the user device;
send an additional request to the first cell for an additional data connection; and
receive, from the first cell, an additional message that indicates the first cell will initiate the additional data connection via the first cellular connection.

7. The user device of claim 1, wherein the one or more processors are further to:
receive additional system information block data from a third cell that does not support dual connectivity;
parse the additional system information block data to identify an additional upper layer indicator element;
determine, based on the additional upper layer indicator element, that the user device is not in a dual connectivity area; and
cause, based on determining that the user device is not in a dual connectivity area, display of an additional indicator on the display of the user device,
wherein the additional indicator indicates that the user device is not in a dual connectivity area.

8. A non-transitory computer-readable medium storing instructions, the instructions comprising:
one or more instructions that, when executed by one or more processors of a user device, cause the one or more processors to:
receive system information block data from a first cell via a first cellular connection;
parse the system information block data to identify an upper layer indicator element;
determine, based on the upper layer indicator element, that the user device is in a dual connectivity area;
cause, based on determining that the user device is in the dual connectivity area, first display of an indicator on a display of the user device;
send, by the user device after causing first display of the indicator, a request to the first cell for a data connection;
receive, at the user device from the first cell, a message that indicates a second cell will initiate the data connection via a second cellular connection; and
cause, based on the message, display of a different indicator on the display of the user device for a threshold amount of time,
wherein the threshold amount of time is finite and based at least in part on a geographic area associated with the second cell.

9. The non-transitory computer-readable medium of claim 8, wherein the indicator indicates that the user device is in the dual connectivity area, and
wherein the different indicator indicates that the user device is in the dual connectivity area and can communicate via the second cellular connection.

10. The non-transitory computer-readable medium of claim 8, wherein the one or more instructions, that cause the one or more processors to cause display of the different indicator on the display of the user device for the threshold amount of time, cause the one or more processors to:
determine a location of the user device; and
determine, based on the location of the user device and the geographic area associated with the second cell, the threshold amount of time.

11. The non-transitory computer-readable medium of claim 8, wherein the one or more instructions, when executed by the one or more processors, further cause the one or more processors to:
communicate data with the second cell via the second cellular connection for a period of time; and
determine, based on the period of time, the threshold amount of time.

12. The non-transitory computer-readable medium of claim 8, wherein the one or more instructions, that cause the one or more processors to determine that the user device is in a dual connectivity area, cause the one or more processors to:
configure a communication component of the user device to facilitate communication with the first cell.

13. The non-transitory computer-readable medium of claim 8, wherein the one or more instructions, when executed by the one or more processors, further cause the one or more processors to:
cause, after causing display of the different indicator for the threshold amount of time, second display of the indicator on the display of the user device;
send an additional request to the first cell for an additional data connection; and
receive, from the first cell, an additional message that indicates the first cell will initiate the additional data connection via the first cellular connection.

14. The non-transitory computer-readable medium of claim 8, wherein the one or more instructions, when executed by the one or more processors, further cause the one or more processors to:
receive additional system information block data from a third cell that does not support dual connectivity;
parse the additional system information block data to identify an additional upper layer indicator element;
determine, based on the additional upper layer indicator element, that the user device is not in a dual connectivity area; and cause, based on determining that the user device is not in a dual connectivity area, display of an additional indicator on the display of the user device,
wherein the additional indicator indicates that the user device is not in a dual connectivity area.

15. A method comprising:
receiving, by a user device, system information block data from a first cell via a first cellular connection;
parsing, by the user device, the system information block data to identify an upper layer indicator element;
determining, by the user device and based on the upper layer indicator element, that the user device is in a dual connectivity area;
causing, by the user device and based on determining that the user device is in the dual connectivity area, first display of an indicator on a display of the user device;
sending, by the user device and after causing first display of the indicator, a request to the first cell for a data connection;
receiving, by the user device and from the first cell, a message that indicates a second cell will initiate the data connection via a second cellular connection; and
causing, by the user device and based on the message, display of a different indicator on the display of the user device for a threshold amount of time,
wherein the threshold amount of time is finite and based at least in part on a geographic area associated with the second cell.

16. The method of claim 15, wherein the indicator indicates that the user device is in the dual connectivity area, and wherein the different indicator indicates that the user device is in the dual connectivity area and can communicate via the second cellular connection.

17. The method of claim 15, wherein causing display of the different indicator on the display of the user device for the threshold amount of time comprises:
determining a location of the user device; and
determining, based on the location of the user device and the geographic area associated with the second cell, the threshold amount of time.

18. The method of claim 15, further comprising:
communicating data with the second cell via the second cellular connection for a period of time; and
determining, based on the period of time, the threshold amount of time.

19. The method of claim 15, wherein determining that the user device is in a dual connectivity area comprises:
configuring a communication component of the user device to facilitate communication with the first cell.

20. The method of claim 15, further comprising:
causing, after causing display of the different indicator for the threshold amount of time, second display of the indicator on the display of the user device;
sending an additional request to the first cell for an additional data connection; and
receiving, from the first cell, an additional message that indicates the first cell will initiate the additional data connection via the first cellular connection.

* * * * *